United States Patent
Rittermann

(10) Patent No.: US 8,127,353 B2
(45) Date of Patent: Feb. 28, 2012

(54) REAL-TIME USER AWARENESS FOR A COMPUTER NETWORK

(75) Inventor: Brian Rittermann, Ellicott City, MD (US)

(73) Assignee: Sourcefire, Inc., Columbia, MD (US)

( * ) Notice: Subject to any disclaimer, the term of this patent is extended or adjusted under 35 U.S.C. 154(b) by 943 days.

(21) Appl. No.: 12/149,196

(22) Filed: Apr. 29, 2008

(65) Prior Publication Data

US 2008/0276319 A1 Nov. 6, 2008

Related U.S. Application Data

(60) Provisional application No. 60/924,070, filed on Apr. 30, 2007.

(51) Int. Cl.
*G06F 11/00* (2006.01)

(52) U.S. Cl. ............... 726/22; 726/23; 726/25

(58) Field of Classification Search ............... 726/2–5, 726/11, 22–25; 713/187–188; 709/223–225
See application file for complete search history.

(56) References Cited

U.S. PATENT DOCUMENTS 4,550,436 A 10/1985 Freeman
(Continued)

FOREIGN PATENT DOCUMENTS

GB 2 432 933 A 6/2007
(Continued)

OTHER PUBLICATIONS

International Search Report and Written Opinion of the International Searching Authority issued on Aug. 18, 2008 in connection with corresponding PCT application No. PCT/US08/05466.

(Continued)

*Primary Examiner* — Hosuk Song
(74) *Attorney, Agent, or Firm* — Posz Law Group, PLC

(57) ABSTRACT

A computer system, device, computer software, and/or method performed by a computer system, is provided for determining a user name likely to be associated with an attack, a configuration, or a vulnerability. First data is obtained which associates user names with individual IP addresses onto which the user names were logged in. Second data is obtained which associates attacks, configurations, or vulnerabilities with individual IP addresses on which the attacks occurred or on which the configurations or vulnerabilities exist. The user names from the first data are associated with the attacks, configurations or vulnerabilities from the second data based on having the same IP address during a log-in. An individual user name is indicated as being associated with attacks which occurred while the individual user name was logged in or with configurations or vulnerabilities for an IP address onto which the user logs in.

20 Claims, 7 Drawing Sheets

U.S. PATENT DOCUMENTS

| | | | |
|---|---|---|---|
| 4,570,157 A | 2/1986 | Kodaira | |
| 4,857,912 A | 8/1989 | Everett et al. | |
| 4,912,748 A | 3/1990 | Horii et al. | |
| 4,985,863 A | 1/1991 | Fujisawa et al. | |
| 5,193,192 A | 3/1993 | Seberger | |
| 5,222,081 A | 6/1993 | Lewis et al. | |
| 5,404,488 A | 4/1995 | Kerrigan et al. | |
| 5,430,842 A | 7/1995 | Thompson et al. | |
| 5,459,841 A | 10/1995 | Flora-Holmquist et al. | |
| 5,495,409 A | 2/1996 | Kanno | |
| 5,497,463 A | 3/1996 | Stein et al. | |
| 5,604,910 A | 2/1997 | Kojima et al. | |
| 5,666,293 A | 9/1997 | Metz et al. | |
| 5,796,942 A | 8/1998 | Esbensen | |
| 5,870,554 A | 2/1999 | Grossman et al. | |
| 5,901,307 A | 5/1999 | Potter et al. | |
| 5,917,821 A | 6/1999 | Gobuyan et al. | |
| 5,919,257 A | 7/1999 | Trostle | |
| 5,963,942 A | 10/1999 | Igata | |
| 5,987,473 A | 11/1999 | Jorgensen | |
| 5,995,963 A | 11/1999 | Nanba et al. | |
| 5,999,937 A | 12/1999 | Ellard | |
| 6,002,427 A | 12/1999 | Kipust | |
| 6,141,686 A | 10/2000 | Jackowski et al. | |
| 6,199,181 B1 | 3/2001 | Rechef et al. | |
| 6,219,786 B1 | 4/2001 | Cunningham et al. | |
| 6,320,848 B1 | 11/2001 | Edwards et al. | |
| 6,321,338 B1 | 11/2001 | Porras et al. | |
| 6,324,656 B1 | 11/2001 | Gleichauf et al. | |
| 6,334,121 B1 | 12/2001 | Primeaux et al. | |
| 6,343,362 B1 | 1/2002 | Ptacek et al. | |
| 6,393,474 B1 | 5/2002 | Eichert et al. | |
| 6,415,321 B1 | 7/2002 | Gleichauf et al. | |
| 6,477,648 B1 | 11/2002 | Schell et al. | |
| 6,487,666 B1 | 11/2002 | Shanklin et al. | |
| 6,499,107 B1 | 12/2002 | Gleichauf et al. | |
| 6,539,381 B1 | 3/2003 | Prasad et al. | |
| 6,546,493 B1 | 4/2003 | Magdych et al. | |
| 6,587,876 B1 | 7/2003 | Mahon et al. | |
| 6,590,885 B1 | 7/2003 | Jorgensen | |
| 6,678,734 B1 | 1/2004 | Haatainen et al. | |
| 6,678,824 B1 | 1/2004 | Cannon et al. | |
| 6,684,332 B1 | 1/2004 | Douglas | |
| 6,711,127 B1 | 3/2004 | Gorman et al. | |
| 6,754,826 B1 | 6/2004 | Challenger et al. | |
| 6,766,320 B1 | 7/2004 | Wang et al. | |
| 6,772,196 B1 | 8/2004 | Kirsch et al. | |
| 6,789,202 B1 | 9/2004 | Ko et al. | |
| 6,816,973 B1 | 11/2004 | Gleichauf et al. | |
| 6,851,061 B1 | 2/2005 | Holland et al. | |
| 6,957,348 B1 | 10/2005 | Flowers et al. | |
| 6,983,323 B2 | 1/2006 | Cantrell et al. | |
| 6,993,706 B2 | 1/2006 | Cook | |
| 6,999,998 B2 | 2/2006 | Russell | |
| 7,032,114 B1 | 4/2006 | Moran | |
| 7,054,930 B1 | 5/2006 | Cheriton | |
| 7,058,821 B1 | 6/2006 | Parekh et al. | |
| 7,065,657 B1 | 6/2006 | Moran | |
| 7,073,198 B1 | 7/2006 | Flowers et al. | |
| 7,076,803 B2 | 7/2006 | Bruton et al. | |
| 7,096,503 B1 | 8/2006 | Magdych et al. | |
| 7,113,789 B1 | 9/2006 | Boehmke | |
| 7,133,916 B2 | 11/2006 | Schunemann | |
| 7,134,141 B2 | 11/2006 | Crosbie et al. | |
| 7,152,105 B2 | 12/2006 | McClure et al. | |
| 7,174,566 B2 | 2/2007 | Yadav | |
| 7,181,769 B1 | 2/2007 | Keanini et al. | |
| 7,257,630 B2 | 8/2007 | Cole et al. | |
| 7,305,708 B2 | 12/2007 | Norton et al. | |
| 7,310,688 B1 | 12/2007 | Chin | |
| 7,313,695 B2 | 12/2007 | Norton et al. | |
| 7,315,801 B1 | 1/2008 | Dowd et al. | |
| 7,317,693 B1 | 1/2008 | Roesch et al. | |
| 7,346,922 B2 * | 3/2008 | Miliefsky | 726/3 |
| 7,350,077 B2 | 3/2008 | Meier et al. | |
| 7,363,656 B2 | 4/2008 | Weber et al. | |
| 7,467,202 B2 | 12/2008 | Savchuk | |
| 7,519,954 B1 | 4/2009 | Beddoe et al. | |
| 7,596,807 B2 | 9/2009 | Ptacek et al. | |
| 7,644,275 B2 | 1/2010 | Mowers et al. | |
| 2001/0027485 A1 | 10/2001 | Ogishi et al. | |
| 2001/0034847 A1 | 10/2001 | Gaul, Jr. | |
| 2002/0035639 A1 | 3/2002 | Xu | |
| 2002/0066034 A1 | 5/2002 | Schlossberg | |
| 2002/0083344 A1 | 6/2002 | Vairavan | |
| 2002/0087716 A1 | 7/2002 | Mustafa | |
| 2002/0112185 A1 | 8/2002 | Hodges | |
| 2002/0123995 A1 | 9/2002 | Shibuya | |
| 2002/0165707 A1 | 11/2002 | Call | |
| 2003/0009699 A1 | 1/2003 | Gupta et al. | |
| 2003/0014662 A1 | 1/2003 | Gupta et al. | |
| 2003/0046388 A1 | 3/2003 | Milliken | |
| 2003/0065817 A1 | 4/2003 | Benchetrit et al. | |
| 2003/0083847 A1 | 5/2003 | Schertz et al. | |
| 2003/0093517 A1 | 5/2003 | Tarquini et al. | |
| 2003/0101353 A1 | 5/2003 | Tarquini et al. | |
| 2003/0126472 A1 | 7/2003 | Banzhof | |
| 2003/0140250 A1 | 7/2003 | Taninaka et al. | |
| 2003/0195874 A1 | 10/2003 | Akaboshi | |
| 2003/0212910 A1 | 11/2003 | Rowland et al. | |
| 2003/0217283 A1 | 11/2003 | Hrastar et al. | |
| 2003/0229726 A1 | 12/2003 | Daseke et al. | |
| 2004/0010684 A1 | 1/2004 | Douglas | |
| 2004/0015728 A1 | 1/2004 | Cole et al. | |
| 2004/0034773 A1 | 2/2004 | Balabine et al. | |
| 2004/0064726 A1 | 4/2004 | Girouard | |
| 2004/0073800 A1 | 4/2004 | Shah et al. | |
| 2004/0093582 A1 | 5/2004 | Segura | |
| 2004/0098618 A1 | 5/2004 | Kim et al. | |
| 2004/0123153 A1 | 6/2004 | Wright et al. | |
| 2004/0172234 A1 | 9/2004 | Dapp et al. | |
| 2004/0179477 A1 | 9/2004 | Lincoln et al. | |
| 2004/0193943 A1 | 9/2004 | Angelino et al. | |
| 2004/0210756 A1 | 10/2004 | Mowers et al. | |
| 2004/0218532 A1 | 11/2004 | Khirman | |
| 2004/0221176 A1 | 11/2004 | Cole | |
| 2004/0250032 A1 | 12/2004 | Ji et al. | |
| 2004/0268358 A1 | 12/2004 | Darling et al. | |
| 2005/0005169 A1 | 1/2005 | Kelekar | |
| 2005/0015623 A1 | 1/2005 | Williams et al. | |
| 2005/0044422 A1 | 2/2005 | Cantrell et al. | |
| 2005/0076066 A1 | 4/2005 | Stakutis et al. | |
| 2005/0108393 A1 | 5/2005 | Banerjee et al. | |
| 2005/0113941 A1 | 5/2005 | Ii et al. | |
| 2005/0114700 A1 | 5/2005 | Barrie et al. | |
| 2005/0160095 A1 | 7/2005 | Dick et al. | |
| 2005/0172019 A1 | 8/2005 | Williamson et al. | |
| 2005/0188079 A1 | 8/2005 | Motsinger et al. | |
| 2005/0229255 A1 | 10/2005 | Gula et al. | |
| 2005/0240604 A1 | 10/2005 | Corl, Jr. et al. | |
| 2005/0251500 A1 | 11/2005 | Vahalia et al. | |
| 2005/0268331 A1 | 12/2005 | Le et al. | |
| 2005/0268332 A1 | 12/2005 | Le et al. | |
| 2005/0273673 A1 | 12/2005 | Gassoway | |
| 2005/0273857 A1 | 12/2005 | Freund | |
| 2006/0174337 A1 | 8/2006 | Bernoth | |
| 2006/0265748 A1 | 11/2006 | Potok | |
| 2006/0294588 A1 | 12/2006 | Lahann et al. | |
| 2007/0027913 A1 | 2/2007 | Jensen et al. | |
| 2007/0058631 A1 | 3/2007 | Mortier et al. | |
| 2007/0162463 A1 | 7/2007 | Kester et al. | |
| 2007/0192863 A1 | 8/2007 | Kapoor et al. | |
| 2007/0195797 A1 | 8/2007 | Patel et al. | |
| 2007/0271371 A1 | 11/2007 | Singh Ahuja et al. | |
| 2007/0288579 A1 | 12/2007 | Schunemann | |
| 2008/0168561 A1 | 7/2008 | Durie et al. | |
| 2009/0028147 A1 | 1/2009 | Russell | |
| 2009/0041020 A1 | 2/2009 | Gibbons et al. | |
| 2009/0182864 A1 | 7/2009 | Khan et al. | |

FOREIGN PATENT DOCUMENTS

| | | |
|---|---|---|
| WO | WO 01/37511 A2 | 5/2001 |
| WO | WO 2004/100011 A1 | 11/2004 |
| WO | WO 2005/064884 A1 | 7/2005 |
| WO | WO 2006/025050 A2 | 3/2006 |

OTHER PUBLICATIONS

U.S. Appl. No. 10/843,353, filed May 2004, Roesch et al., System and Method for Determining Characteristics of a Network and Analyzing Vulnerabilities.
U.S. Appl. No. 10/843,373, filed May 2004, Roesch et al., Systems and Methods for Identifying the Services of a Network.
U.S. Appl. No. 10/843,374, filed May 2004, Roesch et al., System and Methods for Determining Characteristics of a Network Based on Flow Analysis.
U.S. Appl. No. 10/843,375, filed May 2004, Roesch et al., Systems and Methods for Determining Characteristics of a Network and Assessing Confidence.
U.S. Appl. No. 10/843,398, filed May 2004, Roesch et al., Systems and Methods for Determining Characteristics of a Network.
U.S. Appl. No. 10/843,459, filed May 2004, Roesch et al., Systems and Methods for Determining Characteristics of a Network and Enforcing Policy.
U.S. Appl. No. 10/898,220, filed Jul. 2004, Norton et al., Methods and Systems for Multi-Pattern Searching.
U.S. Appl. No. 10/951,796, filed Sep. 2004, Roelker et al., Intrustion Detection Strategies for Hypertext Transport Protocol.
U.S. Appl. No. 11/272,033, filed Nov. 2005, Dempster et al., Systems and Methods for Identifying the Client Applications of a Network.
U.S. Appl. No. 11/272,034, filed Nov. 2005, Vogel, III et al., Systems and Methods for Modifying Network Map Attributes.
U.S. Appl. No. 11/272,035, filed Nov. 2005, Gustafson et al., Intrustion Event Correlation with Network Discovery Information.
U.S. Appl. No. 11/493,934, filed Jul. 2006, Roesch et al., Device, System and Method for Analysis of Fragments in a Fragment Train.
U.S. Appl. No. 11/501,776, filed Aug. 2006, Roesch et al., Device, System and Method for Analysis of Segments in a Transmission Control Protocol (TCP) Session.
U.S. Appl. No. 11/711,876, filed Feb. 2007, Sturges et al., Device, System and Method for Timestamp Analysis of Segments in a Transmission Control Protocol (TCP) Session.
U.S. Appl. No. 11/785,609, filed Apr. 2007, Norton et al., Methods and Systems for Multi-Pattern Searching.
U.S. Appl. No. 11/905,980, filed Oct. 2007, Roesch, Device, System and Method for Use of Micro-Policies in Intrusion Detection/Prevention.
U.S. Appl. No. 12/010,900, filed Jan. 2008, Norton et al., Methods and Systems for Multi-Pattern Searching.
U.S. Appl. No. 12/230,338, filed Aug. 2008, Sturges et al., Speed and Memory Optimization of Intrusion Detection System (IDS) and Intrusion Prevention System (IPS) Rule Processing.
Aho et al., "Efficient String Matching: An Aid to Bibliographic Search," *Communications from the ACM* (Jun. 1975), vol. 18, No. 6, pp. 333-340.
Tarjan, et al., "Storing a Sparse Table," Communications of the ACM (Nov. 1979), vol. 2, No. 11, pp. 606-620.
T. Ptacek, et al., "Insertion, Evasion, and Denial of Service: Eluding Network Intrusion Detection", Jan. 1998, pp. 1-63.
N. Chase, "Active Server Pages 3.0 from Scratch" (Dec. 1999), Searching for products section, 13 pp.
L. Spitzner, "Passive Fingerprinting," *FOCUS on Intrusion Detection: Passive Fingerprinting* (May 3, 2000), pp. 1-4; obtained from: http://www.stillhq.com/pdfdb/000183/data.pdf.
B. Krishnamurthy, "Web Protocols and Practice," (May 1, 2001), pp. 518-520.
G. Lyon, "Remote OS detection via TCP/IP Stack Fingerprinting"(Jun. 30, 2002), pp. 1-12, obtained from: http://web.archive.org/web20021017063625/www.insecure.org/nmap/nmap-fingerprinting-article.html.
U. Shankar and V. Paxson, *Active Mapping: Resisting NIDS Evasion Without Altering Traffic*, Proc. IEEE Symposium on Security and Privacy. May 2003, pp. 1-18.
D. Roelker, "HTTP IDS Evasions Revisited" (Aug. 1, 2003) [online] (retrieved on Nov. 9, 2006). Retrieved from the Internet <URL: http://docs.idsresearch.org/http_ids_evasions.pdf>.
Norton et al., "Multi-Patten Search Engine Aho-Corasick State Machine" (Mar. 17, 2004), Version 2.0, 36 pp.
M. Norton, "Optimizing Pattern Matching for Intrusion Detection" (Jul. 4, 2004) [online] (retrieved on Nov. 9, 2006). Retrieved from the Internet <URL: http://docs.idsresearch.org/OptimizingPatternMatchingForIDS.pdf>.
Norton et al., "Sourcefire Optimizing Pattern Matching for Intrusion Detection" (Sep. 2004), 14 pp.
J. Novak, "Target-Based Fragmentation Reassembly" (Apr. 2005), Revision 2.0, pp. 1-32.
S.Siddharth, "Evading NIDS, revisited" (Dec. 12, 2005).
"Snort™ Users Manual 2.6.0," *The Snort Project* (May 23, 2006), pp. 1-126.
"toupper( )—convert lowercase character to uppercase," http://www.mkssoftware.com, printed on Sep. 20, 2008 from http://web.archive.org, archive date Jun. 30, 2006, 2 pp.
J. Novak et al., "Target-Based TCP Stream Reassembly" (Aug. 3, 2007), Revision 1.0, pp. 1-23, obtained from: http://www.snort/org/docs/stream5-modelAUg032007.pdf.
"TaoSecurity—Dedicated to FreeBSD, network security monitoring, incident response, and network forensics," (Oct. 1, 2007), obtained from: http://taosecurity.blogspot.com/2005/02/shmoocon-concludes-shmoocon-finished.html.
Office Action issued by the U.S. Patent Office on Jul. 16, 2007 in connection with related U.S. Appl. No. 10/898,220.
Office Action issued by the U.S. Patent Office on Sep. 6, 2007 in connection with related U.S. Appl. No. 10/843,374.
Notice of Allowance issued by the U.S. Patent Office on Sep. 6, 2007 in connection with related U.S. Appl. No. 10/843,376.
Office Action issued by the U.S. Patent Office on Sep. 26, 2007 in connection with related U.S. Appl. No. 10/843,353.
Office Action issued by the U.S. Patent Office on Oct. 4, 2007 in connection with related U.S. Appl. No. 10/951,796.
Notice of Allowance issued by the U.S. Patent Office on Oct. 5, 2007 in connection with related U.S. Appl. No. 10/793,887.
International Search Report and Written Opinion of the International Searching Authority issued on Oct. 9, 2007 in connection with PCT application No. PCT/US06/43800, which corresponds to U.S. Appl. No. 11/272,034.
Office Action issued by the U.S. Patent Office on Nov. 21, 2007 in connection with related U.S. Appl. No. 10/843,398.
European Search Report issued by the European Patent Office on Nov. 22, 2007 in connection with European patent application No. 07014575.0-1244, which corresponds to related U.S. Appl. No. 11/493,934.
International Search Report and Written Opinion of the International Searching Authority issued on Dec. 5, 2007 in connection with PCT application No. PCT/US05/25583, which corresponds to U.S. Appl. No. 10/951,796.
European Search Report issued by the European Patent Office on Dec. 27, 2007 in connection with European patent application No. 07015003.2-2413, which corresponds to related U.S. Appl. No. 11/501,776.
Office Action issued by the U.S. Patent Office on Jan. 10, 2008 in connection with related U.S. Appl. No. 10/843,373.
Office Action issued by the U.S. Patent Office on Feb. 5, 2008 in connection with related U.S. Appl. No. 10/843,375.
Office Action issued by the U.S. Patent Office on Feb. 21, 2008 in connection with related U.S. Appl. No. 11/272,033.
Office Action issued by the U.S. Patent Office on Mar. 12, 2008 in connection with related U.S. Appl. No. 10/843,459.
Office Action issued by the U.S. Patent Office on Mar. 20, 2008 in connection with related U.S. Appl. No. 10/843,374.
Final Office Action issued by the U.S. Patent Office on May 9, 2008 in connection with related U.S. Appl. No. 10/843,353.
International Preliminary Report on Patentability mailed on May 22, 2008 in connection with PCT application No. PCT/US06/43800, which corresponds to U.S. Appl. No. 11/272,034.
Final Office Action issued by the U.S. Patent Office on Jun. 4, 2008 in connection with related U.S. Appl. No. 10/843,398.
International Search Report and Written Opinion of the International Searching Authority issued on Jun. 19, 2008 in connection with PCT application No. PCT/US05/25584, which corresponds to U.S. Appl. No. 10/898,220.

Final Office Action issued by the U.S. Patent Office on Jun. 26, 2008 in connection with related U.S. Appl. No. 10/898,220.
International Search Report and Written Opinion of the International Searching Authority issued on Jun. 30, 2008 in connection with PCT application No. PCT/US07/21351, which corresponds to U.S. Appl. No. 11/905,980.
International Search Report and Written Opinion of the International Searching Authority issued on Jul. 2, 2008 in connection with PCT application No. PCT/US08/02454, which corresponds to U.S. Appl. No. 11/711,876.
International Search Report and Written Opinion of the International Searching Authority issued on Jul. 7, 2008 in connection with PCT application No. PCT/US06/43820, which corresponds to U.S. Appl. No. 11/272,035.
Office Action issued by the U.S. Patent Office on Jul. 11, 2008 in connection with related U.S. Appl. No. 11/272,034.
Final Office Action issued by the U.S. Patent Office on Jul. 17, 2008 in connection with related U.S. Appl. No. 10/843,459.
Final Office Action issued by the U.S. Patent Office on Aug. 6, 2008 in connection with related U.S. Appl. No. 10/843,375.
Notice of Allowance issued by the U.S. Patent Office on Aug. 18, 2008 in connection with related U.S. Appl. No. 11/272,033.
Final Office Action issued by the U.S. Patent Office on Aug. 19, 2008 in connection with related U.S. Appl. No. 10/843,373.
Final Office Action issued by the U.S. Patent Office on Aug. 20, 2008 in connection with related U.S. Appl. No. 10/843,353.
Office Action issued by the U.S. Patent Office on May 31, 2011 in connection with related U.S. Appl. No. 12/688,400.
Notice of Allowance issued by the U.S. Patent Office on Jun. 22, 2011 in connection with related U.S. Appl. No. 11/272,035.
Notice of Allowance issued by the U.S. Patent Office on Jul. 22, 2011 in connection with related U.S. Appl. No. 11/711,876.
Extended European Search Report issued by the European Patent Office on Jul. 19, 2011 in connection with European patent application No. 06837333.1-2413, which corresponds to related U.S. Patent No. 7,733,803.
International Search Report and Written Opinion of the International Searching Authority issued on Jul. 28, 2011 in connection with PCT application No. PCT/US2011/032489, which corresponds to U.S. Appl. No. 13/086,819.
Matthew Olney et al.: "What would you do with a pointer and a size? A New Detection Framework", Apr. 22, 2010, XP55002567, http://labs.snort.org/nrt/sfvrt-nrt.pdf (retrieved on Jul. 12, 2011) the whole document.
Office Action issued by the U.S. Patent Office on Oct. 6, 2008 in connection with related U.S. Appl. No. 10/843,374.
Notice of Allowance issued by the U.S. Patent Office on Oct. 15, 2008 in connection with related U.S. Appl. No. 10/951,796.
Notice of Allowance issued by the U.S. Patent Office on Oct. 21, 2008 in connection with related U.S. Appl. No. 10/843,375.
European Office Action issued by the European Patent Office on Nov. 28, 2008 in connection with European patent application No. 07 015 003.2-2413, which corresponds to related U.S. Appl. No. 11/501,776.
Office Action issued by the U.S. Patent Office on Dec. 17, 2008 in connection with related U.S. Appl. No. 10/843,398.
Office Action issued by the U.S. Patent Office on Dec. 23, 2008 in connection with related U.S. Appl. No. 11/272,034.
U.S. Appl. No. 12/820,227, filed Jun. 2010, Vogel, III et al.
R. Hiyoshi, "Practical Guide to Intrusion Detection System: Snort & Tripwire," Japan, Apr. 25, 2004, pp. 57-230 (concise English explanation of relevance attached).
"Enhanced Operating System Identification with Nessus," Tenable Network Security (2007), obtained from: http://blog.tenablesecurity.com/2009/02/enhanced_operat.html, posted by R. Gula on Feb. 16, 2009 (3 pp. total).
Advisory Action issued by the U.S. Patent Office on Aug. 3, 2010 in connection with related U.S. Appl. No. 10/843,374.
Final Office Action issued by the U.S. Patent Office on Sep. 8, 2010 in connection with related U.S. Appl. No. 10/843,459.
Final Office Action issued by the U.S. Patent Office on Sep. 17, 2010 in connection with related U.S. Appl. No. 11/711,876.

Office Action mailed Sep. 7, 2010 from the Japan Patent Office for Japanese patent application No. 2007-523639 in connection with related U.S. Appl. No. 10/951,796, now U.S. patent No. 7,496,962 (English translation enclosed).
Final Office Action issued by the U.S. Patent Office on Sep. 30, 2010 in connection with related U.S. Appl. No. 11/493,934.
U.S. Appl. No. 13/046,127, filed Mar. 11, 2011, Roesch.
U.S. Appl. No. 13/086,819, filed Apr. 14, 2011, Olney et al.
Press Release, "FaceTime Protects Enterprises from Information Leaks over Collaborative Suites like Microsoft OCS and IBM Sametime", issued by FaceTime Communications, Belmont, California, Jul. 14, 2008, retrieved from www.facetime.com/pr/pr080714.aspx , Dec. 1, 2009.
Office Action mailed Mar. 1, 2011 from the Japan Patent Office for Japanese patent application No. 2007-523640 in connection with related U.S. Appl. No. 10/898,220, now U.S. patent No. 7,539,681, U.S. Appl. No. 11/785,609, now U.S. patent No. 7,756,885, and U.S. Appl. No. 12/010,900 (English translation enclosed).
Office Action issued by the U.S. Patent Office on Apr. 6, 2011 in connection with related U.S. Appl. No. 11/711,876.
Office Action issued by the U.S. Patent Office on Apr. 13, 2011 in connection with related U.S. Appl. No. 12/230,338.
Notice of Allowance issued by the U.S. Patent Office on Apr. 6, 2011 in connection with related U.S. Appl. No. 12/010,900.
PCT International Preliminary Report on Patentability mailed on Apr. 21, 2011 by the International Bureau of WIPO in connection with PCT patent application No. PCT/US2009/059965, which corresponds to U.S. Appl. No. 12/575,612.
Office Action issued by the U.S. Patent Office on Jul. 6, 2009 in connection with related U.S. Appl. No. 10/843,459.
Office Action issued by the U.S. Patent Office on Jul. 7, 2009 in connection with related U.S. Appl. No. 10/843,398.
Office Action issued by the U.S. Patent Office on Jul. 28, 2009 in connection with related U.S. Appl. No. 10/843,353.
Office Action issued by the U.S. Patent Office on Jul. 30, 2009 in connection with related U.S. Appl. No. 11/493,934.
Office Action issued by the U.S. Patent Office on Aug. 20, 2009 in connection with related U.S. Appl. No. 10/843,374.
International Preliminary Report on Patentability mailed on Sep. 11, 2009 in connection with PCT application No. PCT/US08/002454, which corresponds to U.S. Appl. No. 11/711,876.
Advisory Action issued by the U.S. Patent Office on Sep. 29, 2009 in connection with related U.S. Appl. No. 10/843,459.
R. Deraison, et al., "Passive Vulnerability Scanning: Introduction to NeVO," *Tenable Network Security*, May 30, 2004, pp. 1-13.
Full Band and Matrix Algorithms (Jun. 9, 2004), http://web.archive.org/web20040109154658/http://www.netlib.org/utk/lsi/pcwLSI/text/node150.html.
R. Deraison, et al., "Nessus Network Auditing," *Sungress Publishing*, Jul. 20, 2004, pp. 1-13.
International Preliminary Report on Patentability mailed on Apr. 7, 2009 in connection with PCT application No. PCT/US07/021351, which corresponds to U.S. Appl. No. 11/905,980.
Office Action issued by the U.S. Patent Office on Apr. 28, 2009 in connection with related U.S. Appl. No. 11/501,776.
Final Office Action issued by the U.S. Patent Office on May 13, 2009 in connection with related U.S. Appl. No. 10/843,374.
Office Action issued by the U.S. Patent Office on May 14, 2009 in connection with related U.S. Appl. No. 11/272,034.
International Search Report and Written Opinion of the International Searching Authority mailed on May 27, 2009 in connection with PCT application No. PCT/US09/02210, which corresponds to U.S. Appl. No. 12/230,338.
Office Action issued by the U.S. Patent Office on Jun. 1, 2009 in connection with related U.S. Appl. No. 11/272,035.
Notice of Allowance issued by the U.S. Patent Office on Jun. 11, 2009 in connection with related U.S. Appl. No. 10/843,373.
Office Action issued by the U.S. Patent Office on Jun. 23, 2009 in connection with related U.S. Appl. No. 11/785,609.
J. Howe, "An Environment for "Sniffing" DCE-RPC Traffic," *CITI Technical Report 93-4*, Jun. 21, 1993, 12 pages total.
European Search Report issued by the European Patent Office on Oct. 12, 2009 in connection with European patent application No.

05773501.1-2201, which corresponds to related U.S. Appl. Nos. 10/898,220, 11/785,609 and 12/010,900.
Final Office Action issued by the U.S. Patent Office on Oct. 29, 2009 in connection with related U.S. Appl. No. 11/501,776.
International Preliminary Report on Patentability mailed on Nov. 12, 2009 in corresponding PCT application No. PCT/US08/005466.
Advisory Action issued by the U.S. Patent Office on Dec. 2, 2009 in connection with related U.S. Appl. No. 10/843,398.
Notice of Allowance issued by the U.S. Patent Office on Dec. 8, 2009 in connection with related U.S. Appl. No. 11/501,776.
Final Office Action issued by the U.S. Patent Office on Dec. 8, 2009 in connection with related U.S. Appl. No. 11/272,034.
Final Office Action issued by the U.S. Patent Office on Dec. 9, 2009 in connection with related U.S. Appl. No. 11/272,035.
Office Action issued by the U.S. Patent Office on Dec. 17, 2009 in connection with related U.S. Appl. No. 11/493,934.
R. Gula, "Passive Vulnerability Detection. *Techniques to passively find network security vulnerabilities*," Sep. 9, 1999 (5 pp.).
R.P. Lippmann et al., "Passive Operating System Identification from TCP/IP Packet Headers," *Proceedings Workshop on Data Mining for Computer Security (DMSEC )*, Nov. 2003 (10 pp.).
N. Brownlee, et al., "Methodology for Passive Analysis of a University Internet Link," *PAM2001 Passive and Active Measurement Workshop*, Apr. 2001 (7 pp.).
Notice of Allowance issued by the U.S. Patent Office on Jan. 7, 2010 in connection with related U.S. Appl. No. 10/843,353.
Notice of Allowance issued by the U.S. Patent Office on Jan. 8, 2010 in connection with related U.S. Appl. No. 10/843,373.
Office Action issued by the European Patent Office on Jan. 15, 2010 in connection with European patent application No. 05773501.1-2201, which corresponds to related U.S. Appl. Nos. 10/898,220, 11/785,609 and 12/010,900.
Advisory Action issued by the U.S. Patent Office on Feb. 24, 2010 in connection with related U.S. Appl. No. 11/272,035.
Office Action issued by the U.S. Patent Office on Mar. 22, 2010 in connection with related U.S. Appl. No. 11/493,934.
Notice of Allowance issued by the U.S. Patent Office on Mar. 5, 2010 in connection with related U.S. Appl. No. 11/785,609.
Final Office Action issued by the U.S. Patent Office on Mar. 17, 2010 in connection with related U.S. Appl. No. 10/843,374.
Notice of Allowance issued by the U.S. Patent Office on Feb. 5, 2010 in connection with related U.S. Appl. No. 11/272,034.
Office Action issued by the U.S. Patent Office on Mar. 16, 2010 in connection with related U.S. Appl. No. 11/272,035.
International Search Report and Written Opinion of the International Searching Authority issued on Mar. 16, 2010 in connection with PCT application No. PCT/US09/59965, which corresponds to U.S. Appl. No. 12/575,612.
"Snort™ Users Manual 2.2.0RC1," *The Snort Project*, Jun. 28, 2004, Retrieved from the Internet: URL:http://cvs.snort.org/viewcvs.cgi/*checkout*/snort/doc/snort_manual.pdf?rev=1.25&content-type=application/pdf [retrieved on Nov. 18, 2010 ] (XP002610157).
V. Yegneswaran, et al., "Internet Sieve: An Architecture for Generating Resilient Signatures," May 2004, Retrieved from the Internet: URL:http://www.cc.gatech.edu/~giffin/papers/tr1507/tr1507.pdf [retrieved on Nov. 18, 2010] (XP002610154).
D. Roekler, "HTTP IDS Evasions Revisited," Jan. 8, 2003, Retrieved from the Internet: URL:http://docs.idsresearch.org/http_ids_evasions.pdf [Nov. 18, 2010] (XP002610155).
M. Norton, et al., "The New Snort," *Computer Security Journal*, CSI Security Institute, XIX, No. 3, (Jan. 1, 2003), pp. 37-47, ISSN: 0277-0865 (XP008039475).
European Search Report issued by the European Patent Office on Dec. 6, 2010 in connection with European patent application No. 05773540.9-2413, which corresponds to related U.S. Patent No. 7,496,962.
Notice of Allowance issued by the U.S. Patent Office on Jan. 24, 2011 in connection with related U.S. Appl. No. 10/843,459.

Notice of Allowance issued by the U.S. Patent Office on Feb. 24, 2011 in connection with related U.S. Appl. No. 11/493,934.
U.S. Appl. No. 12/813,859, filed Jun. 2010, Polley et al.
V. Jacobson, et al., Request for Comments: 1323, "TCP Extensions for High Performance," May 1992 (35 pages).
D. Joseph, et al., "A Policy-aware Switching Layer for Data Centers," *SIGCOMM*, Aug. 17-22, 2008, pp. 51-62.
Office Action issued by the U.S. Patent Office on Apr. 7, 2010 in connection with related U.S. Appl. No. 11/711,876.
Office Action issued by the U.S. Patent Office on Apr. 15, 2010 in connection with related U.S. Appl. No. 12/010,900.
Office Action issued by the U.S. Patent Office on Apr. 21, 2010 in connection with related U.S. Appl. No. 10/843,459.
Notice of Allowance issued by the U.S. Patent Office on May 24, 2010 in connection with related U.S. Appl. No. 10/843,398.
U.S. Appl. No. 12/969,682, filed Dec. 2010, Roesch et al.
Notice of Allowance issued by the U.S. Patent Office on Oct. 5, 2010 in connection with related U.S. Appl. No. 10/843,374.
International Preliminary Report on Patentability mailed on Oct. 19, 2010 in connection with PCT application No. PCT/US2009/02210, which corresponds to U.S. Appl. No. 12/230,338.
Final Office Action issued by the U.S. Patent Office on Oct. 25, 2010 in connection with related U.S. Appl. No. 11/272,035.
Final Office Action issued by the U.S. Patent Office on Nov. 4, 2010 in connection with related U.S. Appl. No. 10/843,459.
Office Action issued by the U.S. Patent Office on Nov. 19, 2010 in connection with related U.S. Appl. No. 10/843,459.
Final Office Action issued by the U.S. Patent Office on Nov. 24, 2010 in connection with related U.S. Appl. No. 12/010,900.
Office Action issued by the U.S. Patent Office on Dec. 22, 2010 in connection with related U.S. Appl. No. 11/905,980.
Office Action issued by the U.S. Patent Office on Jan. 16, 2009 in connection with related U.S. Appl. No. 10/843,353.
Office Action issued by the U.S. Patent Office on Jan. 21, 2009 in connection with related U.S. Appl. No. 11/493,934.
Notice of Allowance issued by the U.S. Patent Office on Jan. 21, 2009 in connection with related U.S. Appl. No. 10/898,220.
Office Action issued by the U.S. Patent Office on Feb. 4, 2009 in connection with related U.S. Appl. No. 10/843,373.
Office Action issued by the U.S. Patent Office on Feb. 9, 2009 in connection with related U.S. Appl. No. 10/843,459.
International Preliminary Report on Patentability and Written Opinion of the International Searching Authority mailed on Mar. 3, 2009 in connection with PCT application No. PCT/US05/025584, which corresponds to U.S. Appl. No. 10/898,220.
International Preliminary Report on Patentability and Written Opinion of the International Searching Authority mailed on Mar. 17, 2009 in connection with corresponding PCT application No. PCT/US06/43820, which corresponds to related U.S. Appl. No. 11/272,035.
International Search Report and Written Opinion of the International Searching Authority issued on Sep. 1, 2011 in connection with PCT application No. PCT/US2011/035874, which corresponds to U.S. Appl. No. 12/820,227.
Francois Gagnon et al.: "A Hybrid Approach to Operating System Discovery using Answer Set Programming", Integrated Network Management, 2007. IM'07, $10^{th}$ IFIP/IEEE International Symposium on, IEEE, PI, May 1, 2007, pp. 391-400, XP031182713, ISBN: 978-1-4244-0798-9, p. 293, 394-397.
Final Office Action issued by the U.S. Patent Office on Sep. 14, 2011 in connection with related U.S. Appl. No. 12/230,338.
Office Action issued by the U.S. Patent Office on Oct. 21, 2011 in connection with related U.S. Appl. No. 12/969,682.
Notice of Allowance issued by the Japanese Patent Office on Sep. 30, 2011 in connection with Japanese Patent Application No. 2007-523640, which corresponds to related U.S. Appl. No. 10/898,220, now U.S. Patent No. 7,539,681.
Advisory Action issued by the U.S. Patent Office on Nov. 28, 2011 in connection with related U.S. Appl. No. 12/230,338.

* cited by examiner

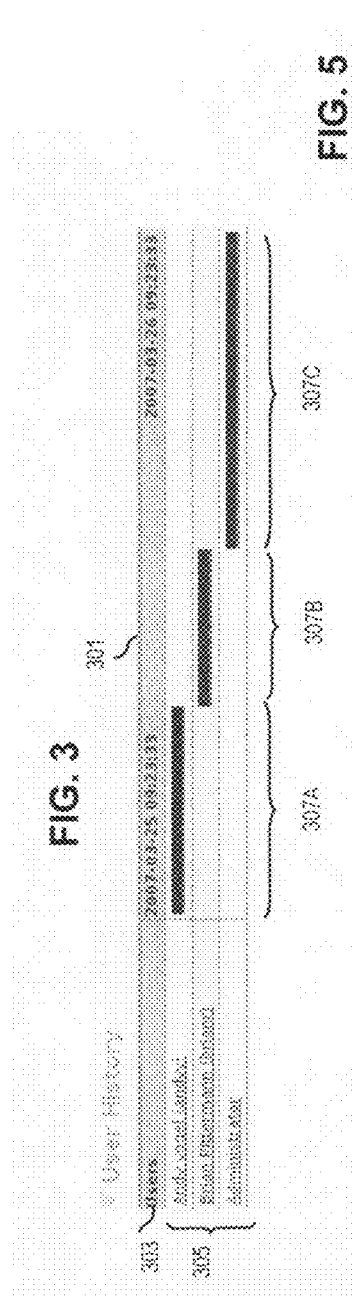

REAL-TIME USER AWARENESS FOR A COMPUTER NETWORK

CROSS-REFERENCE TO RELATED APPLICATIONS

This application claims the benefit of U.S. Provisional Application No. 60/924,070, filed Apr. 30, 2007, which is expressly incorporated herein by reference.

TECHNICAL FIELD

The technical field relates in general to computer network security, and more specifically to linking computer security-related network behavior, traffic, and events to individual users.

BACKGROUND

Previously, network intrusion detection technologies can determine that there are security problems, for example, an attack, a configuration problem, or a vulnerability, related to a particular computer system or network device. For example, network intrusion detection technologies and network intrusion prevention technologies such as Sourcefire SNORT sensors can analyze network traffic to notice attacks. As another example, Sourcefire RNA technology can maintain a list of IP (Internet Protocol) addresses and corresponding configurations, such as operating system, services, client applications, TCP (transmission control protocol) and UDP (user datagram protocol) protocols, and the like. Thus, a security administrator can obtain information about which particular systems have experienced attacks, or have problematic configurations, or have vulnerabilities.

A security administrator might want to talk to the user that operates the system having the security problems, for example, to discuss the user's activities, such as opening of e-mails, visiting of internet sites, installing the latest virus software, or other reasons regarding the user's actions or inaction which may affect or compromise security. In practice, to track the computers of individual users, administrators typically maintain a spreadsheet of computers assigned to users. Unfortunately, computers tend to be shuffled between users at an organization without necessarily informing the administrators. Consequently, the administrators' spreadsheets tend to not reflect the current user. The security administrator does not have the capability readily to find out which user is actually connected to various activities which cause security problems.

Other available technology includes software which can match network traffic to a user which logged in, for example eTelemetry™ "LOCATE" software, which outputs a user name and IP address pair. However, users can log in to different machines. Moreover, such software does not track when the user logs out. Hence, an administrator that attempted to utilize the information output by the network intrusion detection/prevention system as well as the output from the eTelemetry software would have great difficulty determining with any certainty which user is responsible for the security problems.

SUMMARY

Accordingly, if an awareness of the user and a computer system is to be provided, the data about the operational network environment and attacks, and the users logging in and out must be updated in real-time.

Therefore, one or more embodiments provide systems, computer readable mediums, and methods performed by a computer system, for determining a user name likely to be associated with an attack, a configuration, or a vulnerability. First data is obtained which associates user names with individual IP addresses onto which the user names were logged in. Second data is obtained which associates attacks, configurations, or vulnerabilities with individual IP addresses on which the attacks occurred or on which the configurations or vulnerabilities exist. The user names from the first data are associated with the attacks, configurations or vulnerabilities from the second data based on having the same IP address during a log-in. An individual user name is indicated as being associated with attacks which occurred while the individual user name was logged in or with configurations or vulnerabilities for an IP address onto which the user logs in.

Another embodiment provides a computer system or a device for determining a user name likely to be associated with an attack, a configuration, or a vulnerability. The computer system or device includes a display operable to receive screens to be displayed to a user. Also included is a processor cooperatively operable with the memory and the display. The processor is configured to facilitate: obtaining first data which associates user names with individual IP addresses onto which the user names were logged in; obtaining second data which associates attacks, configurations or vulnerabilities with individual IP addresses on which the attacks occurred or on which the configurations or vulnerabilities exist; and associating the user names from the first data with the attacks, configurations or vulnerabilities from the second data based on having the same IP address during a log-in. An individual user name is indicated in a screen to be displayed to a user as being associated with attacks which occurred while the individual user name was logged in and with configurations or vulnerabilities for an IP address onto which the user logs in.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIG. 3 is a display illustrating user login history for a host;

FIG. 4 is an example message of a user login;

FIG. 5 is an example message of a user account update;

DETAILED DESCRIPTION

Figure 1:
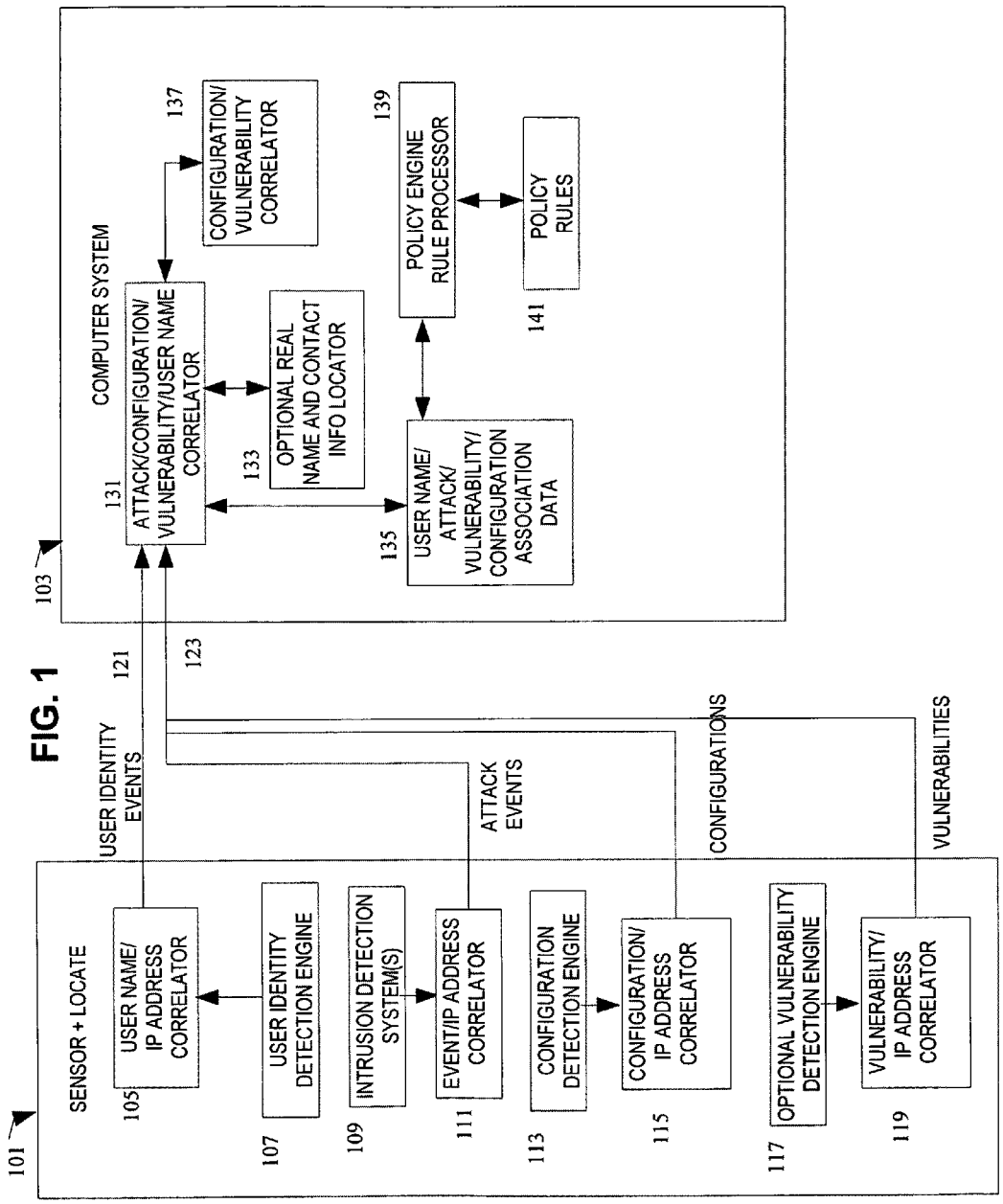
FIG. 1 is a block diagram illustrating a simplified and representative architecture associated with user awareness.

In overview, the present disclosure concerns analysis of network traffic on communication networks, often referred to as packet switching networks, which support communication from wireless and/or wire line devices to a destination. Communications on such communication networks may be analyzed for intrusion detection/prevention, for example according to various rules, and the communications further may be analyzed to determine when users log in. More particularly, various inventive concepts and principles are embodied in systems, devices, and methods therein for providing real time user awareness for a computer network, optionally in connection with intrusion detection/prevention systems.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

Relational terms such as first and second, and the like, if any, are used herein solely to distinguish one from another entity, item, or action without necessarily requiring or implying any actual such relationship or order between such entities, items or actions. Some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts, further discussion of such software and ICs, if any, will be limited to the essentials with respect to the principles and concepts used by the exemplary embodiments.

As further discussed herein below, various inventive principles and combinations thereof are advantageously employed to provide real time user awareness (RUA). RUA can deliver powerful user identification capabilities to speed incident containment, enhance control, eliminate manual efforts and associated costs, and improve security decision-making. "User awareness" refers to the capability of identifying a particular user name as being associated with particular attacks, configurations, and/or vulnerabilities; "real-time" refers to the capability of providing the user awareness at or shortly after the event leading to the user awareness occurs.

RUA enables customers for the first time to correlate threat, endpoint, and network intelligence with user identity information, equipping them to identify the source of policy breaches, attacks, or network vulnerabilities immediately. By linking network behavior, traffic, and events directly to individual users, RUA empowers administrators to mitigate risk, block users or user activity, and take action to protect others from disruption-tightening security without hindering business operations or employee productivity. These capabilities also significantly improve customers' audit controls and assure regulatory compliance.

RUA is the latest industry altering technology to fill what has been a significant hole in companies' security strategies. Building on network awareness, such as provided by Sourcefire RNA, customers are provided with user awareness, so that they can set and enforce policies based on exact knowledge of specific users and their activities on the network. This is a significant advantage for any company that has implemented a NAC strategy only to find out that they are still having network usage issues.

Furthermore, when used as part of an integrated Enterprise Threat Management (ETM) approach, RUA allows customers to create user-based policy and response rules and apply these across, for example, intrusion prevention, NBA (network behavior analysis), NAC (network access control), and Vulnerability Assessment security components. This enables users to implement and enforce policies specific to individuals, departments, or other user characteristics.

RUA delivers integrated user awareness never before available, including 24×7 passive identity discovery with comprehensive user identity information capture which can include, e.g., e-mail address, IM (instant message) address, and IP address. Optionally, it can also identify all the IP addresses to which a user is connected, along with a time stamp, to support long-time horizon analysis and forensics. With the user intelligence provided by RUA, administrators can immediately identify, list, and respond to users, for example, those who continually download enormous files or run unauthorized applications.

Further in accordance with exemplary embodiments, a real time user awareness (RUA) is provided to allow a customer to see user names that are associated with IP addresses on the network. For example, a hypertext transfer protocol (HTTP) flow is seen that downloaded two gigabytes of information. The administrator can see the user name (such as an e-mail address or IM address) of the person who initiated that flow.

A goal of RUA is to allow an administrator to see not only which hosts are on the network, and what they are doing, but also what users are on the network and what the users are doing. This disclosure includes a discussion of detection of user names on the network and communication and display of this information.

Referring now to FIG. 1, a block diagram illustrating a simplified and representative architecture associated with user awareness will be discussed and described. In this illustration, there is a sensor and location functional block 101 and a computer system 103.

The computer system 103 can include an attack/configuration/vulnerability/user name correlator 131, an optional real name and contact info locator 133, user name/attack/vulnerability/configuration association data 135, optional configuration/vulnerability correlator 137, policy engine rule processor 139, and policy rules 141.

The attack/configuration/vulnerability/user name correlator 131 can associate a user name from the first data, with an attack, or a configuration, or a vulnerability from the second data. The correlation can be made by referring, in the second data, to an attack, configuration, or vulnerability and IP address associated therewith, as well as the time of the attack, configuration, or vulnerability. Then, the correlator 131 can determine which user name was logged on to that IP address during the time of the attack, configuration or vulnerability; and the correlator 131 can indicate that user name (which was logged on that IP address) as being associated with the attack, configuration, or vulnerability from the second data. The correlator 131 can perform this association in reverse, that is, beginning with the attack, configuration, or vulnerability on an IP address, and can determine the user which was logged on that IP address at that time. The correlator 131 can perform this association repetitively, for example, when new attacks, configurations, or vulnerabilities are received in the first data, or when new users are received in the first data. The user name/attack/vulnerability/configuration association data 135 can store each user name from the first data, which was logged on that IP address, which was determined to be associated with the attack, configuration, or vulnerability from the second data, for example, as a list or addressable database.

The optional real name and contact info locator 133 can provide a user's real name and/or contact information based on a user name. The real name and contact information corresponding to a user can be obtained using an address book application, for example, LDAP (lightweight directory access protocol). The real name and contact information can be used, for example, by a system administrator to contact the user and discuss suggestions for maintaining network security for the IP address onto which the user logs in (e.g., updating software, changing a password, or similar). Accordingly, one or more embodiments include querying for respective real names of the user names, and providing the respective real names and attacks, configurations or vulnerabilities individually associated therewith.

The configuration/vulnerability correlator 137 can be provided with a configuration, and can return an indication of one or more vulnerabilities associated with the configuration. Known software can be utilized as the correlator 137, for example, Sourcefire RNA or Sourcefire Decense Center. The correlator 137 can be included, for example, if the optional vulnerability detection engine 117 is not included, or if additional checking of vulnerabilities is desired in addition to the vulnerability detection engine 117. Accordingly, one or more embodiments provides for deriving vulnerabilities for the configurations from the second data, and displaying a list of configurations which have the derived vulnerabilities and respective user names individually associated therewith.

The policy rules 141 are the rules that can be used by, for example, an intrusion detection system or intrusion prevention system, to define an attack, and are conventionally created in conjunction with a policy engine rule processor 139. Techniques are known for creating policy rules. The user name with associated attack, configuration, and/or vulnerability can be provided to the policy engine rule processor 139, to be used in connection with creating policy rules.

The sensor and locate functional block 101 can include a user identity detection engine 107, a user name/IP address correlator 105, an intrusion detection system 109, an event/IP address correlator 111, a configuration detection engine 113, a configuration/IP address correlator 115, an optional vulnerability detection engine 117, and an optional vulnerability/IP address correlator 119.

The sensor and locate functional block 101 provides first data 121 which associates user names with individual IP addresses onto which the user names were logged, and second data 123 which associates attacks, configurations, or vulnerabilities with individual IP addresses on which the attacks occurred, or on which the vulnerability or configuration exists.

The user name/IP address correlator 105 receives the user identities which are detected on the network by the user identity detection engine 107, correlates the user names for the user events (such as logging on) and the IP addresses on which the user names are used for example in connection with known techniques, and outputs user identity events 121. A user identity event indicates an individual user name and an individual IP address onto which the user name is logged. User identities are extracted from network traffic. A commercially available software product can be used to do this, for example, "LOCATE" by eTelemetry. Optionally, the user identity event also includes the time of login. However, since the user name/IP address correlator 105 is driven by events output from the event/IP address correlator 107, the user identity events 121 are output by the user name/IP address correlator in real time.

The event/IP address correlator 111 receives attack events which are detected on the network by the intrusion detection system 109, correlates the events and the IP addresses on which the events occurred for example using known software, and outputs attack events. An attack event indicates one or more attacks and an individual IP address on which the attack occurred. Optionally, the attack event can include other information such as the time and/or type of attack. Since the event/IP address correlator 111 is driven by events output from the intrusion detection system 109, the attack events are output by the event/IP address correlator 111 in real time. The SNORT sensor or other passive or active traffic monitor is an example of an event/IP address correlator 111. The event/IP address correlator 111 can monitor traffic to/from a computer system, and can apply detection policies and rules to determine whether an attack occurred. The traffic monitor can be provided some distance from the network being monitored, if desired.

The configuration/IP address correlator 115 receives configurations which are detected on the network by the configuration detection engine 113, correlates the configurations and the IP addresses on which the configurations are used for example using known software, and outputs configurations. A configuration output from the configuration/IP address correlator 115 indicates a configuration and a particular IP address having that configuration; optionally the configuration can also include additional information regarding, as will be appreciated by one of skill in the art. Since the configuration/IP address correlator 115 is driven by events output from the configuration detection engine 113, the configurations are output by the configuration/IP address correlator 115 in real time.

An appropriate configuration/IP address correlator 115 is RNA, available from Sourcefire, or other network discovery sensors which can provide an intimate knowledge of the local network's configuration. For example, the RNA can perform network discovery, by passively collecting configuration information on network hosts and providing that information. The network discovery can alternatively be active, for example by using a scanning tool to probe systems (this technique studies how systems respond to probes to discover information), or by including user provided information about network assets. Other passive or active network discovery sensors may be used to obtain configuration information. Alternatively, or in addition, the configuration can be manually entered and/or modified.

The optional vulnerability/IP address correlator 119 receives vulnerabilities which are detected on the network by the optional vulnerability detection engine 117, correlates the vulnerabilities and the IP addresses on which the vulnerabilities exist, and outputs the vulnerabilities. Known software can be used as the vulnerability/IP address correlator 119. A vulnerability output by the vulnerability/IP address correlator 119 indicates a vulnerability and a particular IP address on which that vulnerability exists. The vulnerability/IP address correlator can be driven by vulnerability events output from the optional vulnerability detection engine 117, such that vulnerabilities are output by the vulnerability/IP address correlator 119 in real time.

Figure 2:
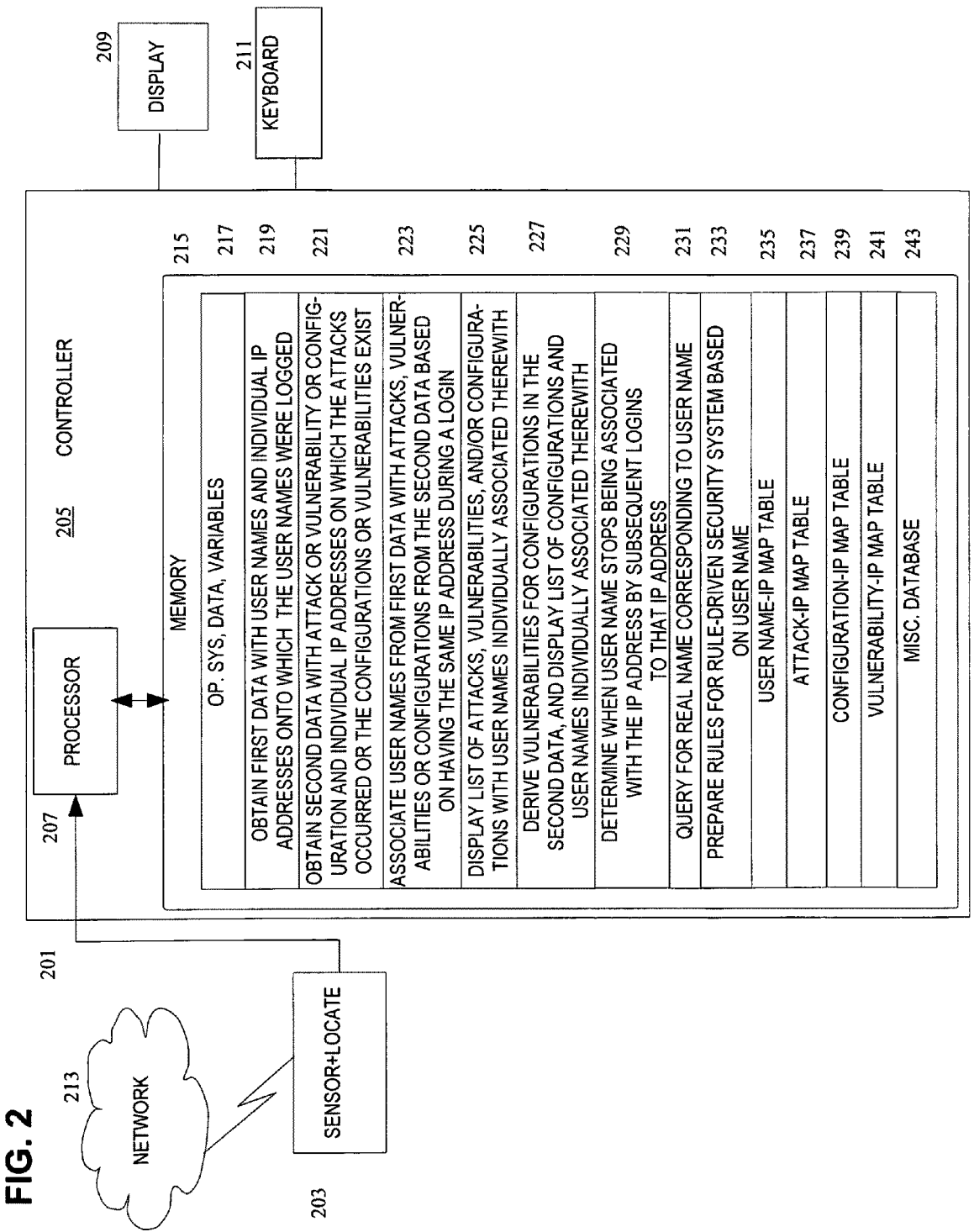
FIG. 2 is a block diagram illustrating components of a computer system related to user awareness.

Referring now to FIG. 2, a block diagram illustrating components of a computer system related to user awareness will be discussed and described. The computer system 201 may include one or more controllers 205, which can receive signals from a sensor with IP address location detection functionality 203 (such as described above) which senses communications from a network 213 in accordance with known techniques. The controller 205 can include a processor, a memory 215, an optional display 209, and/or an optional user input device such as a keyboard 211.

The processor may comprise one or more microprocessors and/or one or more digital signal processors. The memory 215 may be coupled to the processor and may comprise a read-only memory (ROM), a random-access memory (RAM), a programmable ROM (PROM), and/or an electrically erasable read-only memory (EEPROM). The memory 215 may include multiple memory locations for storing, among other things, an operating system, data and variables 217 for programs executed by the processor; computer programs for causing the processor to operate in connection with various functions such as obtaining 219 first data with user names and individual IP addresses onto which the user names were logged; obtaining 221 second data with attack or vulnerability or configuration and individual IP addresses on which the attacks occurred or the configurations or vulnerabilities exist; associating 223 user names from the first data with attacks, vulnerabilities or configurations from the second data base on having the same IP address during a login; displaying 225 a list of attacks, vulnerabilities, and/or configurations with user names individually associated therewith; deriving 227 vulnerabilities for configurations in the second data, and displaying a list of configurations and user names individually associated therewith; determining 229 when a user name stops being associated with the IP address by subsequent logins by that user name or to that IP address; querying 231 for a real name corresponding to the user name; preparing 233 rules for rule-driven security system based on the user name; and/or other processing; a user name-IP map table 235; an attack-IP map table 237; a configuration-IP map table 239; a vulnerability-IP map table 241; and a database 243 for other information used by the processor. The computer programs may be stored, for example, in ROM or PROM and may direct the processor in controlling the operation of the computer system 201.

The processor may be programmed for obtaining 219 first data with user names and individual IP addresses onto which the user names were logged. For example, the processor can receive an event stream of events which are generated when a user logs in, including the user name and the IP address, optionally including the time of log-in. The processor 207 can timestamp the user name and the IP address, for example, with a time of receipt. Optionally, the event stream with the log-ins can be stored separately, for example, as the user name-IP map table 235. The first data can be obtained from the events as received and/or as stored.

The processor 207 may be programmed for obtaining 221 second data with attack or vulnerability or configuration and individual IP addresses on which the attacks occurred or the configurations or vulnerabilities exist. For example, the processor can receive an event stream of events which are generated when an attack occurs, including the attack and the IP address, optionally including the time of attack. Also, the processor can receive an event stream of events which are generated when a configuration is detected (for example, due to a configuration change or new IP address), and the IP address having the configuration, optionally with a time of configuration. Furthermore, the processor can receive an event stream of events which are generated when a vulnerability is detected and the IP address having the vulnerability, optionally with the time the vulnerability is detected. The processor 207 can time stamp the received events, for example with a time of receipt. Optionally, the event stream(s) with the attack, vulnerability, and/or configuration can be stored separately, such as in the attack-IP map table 237, configuration-IP map table 239, and/or vulnerability-IP map table 241. The second data can be obtained from the events as received and/or as stored.

The processor 207 may be programmed for associating 223 user names from the first data with attacks, vulnerabilities or configurations from the second data base on having the same IP address during a login. For example, the processor 207 can refer to an attack, configuration, or vulnerability and IP address associated therewith, as well as the time of the attack, configuration, or vulnerability, for example, stored in the attack-IP map table 237, configuration-IP map table 239, or vulnerability-IP map table 241. The processor 207 can determine which user name was logged on to the IP address listed in the respective table during the time of the attack, configuration or vulnerability, by referring to the user name-IP map table 235 by IP address and time to look up the user name.

The processor 207 may be programmed for displaying 225 a list of attacks, vulnerabilities, and/or configurations with user names individually associated therewith, for example, the list developed by associating 223 user names from the first data with the vulnerability. For example, the list can be displayed as part of a user interface on the display 209, or provided as a report. The user interface can be interactive, so that a user can drill down to various aspects of the list which are of interest, or can sort the list to be displayed as preferred. User interfaces are discussed in more detail below.

The processor 207 may be programmed for deriving 227 vulnerabilities for configurations in the second data, and displaying a list of configurations and user names individually associated therewith. Certain configurations have particular vulnerabilities, while other configurations do not have those vulnerabilities. The vulnerabilities can be derived by using known techniques, or by accessing known software which can indicate the vulnerabilities based on input configurations.

The processor 207 may be programmed for determining 229 when a user name stops being associated with the IP address by subsequent logins to that IP address. For example, a chronological list of user names on each IP address can be maintained, together with time of log-in. It can be assumed that a user name has logged out of the IP address when the chronologically subsequent user name is logged in to the same IP address. Optionally, a time of an express or implied log out can be stored, if provided (for example with the user log-in events).

The processor 207 may be programmed for querying 231 for a real name corresponding to the user name. This is discussed in detail elsewhere, for example, an LDAP query of an address book database based on the user name can return the real name, optionally together with any stored contact information.

The processor 207 may be programmed for preparing 233 rules for rule-driven security system based on the user name. This is discussed in more detail elsewhere herein.

The processor 207 may be programmed for a user name-IP map table 235; an attack-IP map table 237; a configuration-IP map table 239; and a vulnerability-IP map table 241. The user name-IP map table 235 can include entries associating a user name with an IP address, for example, the user name and corresponding IP address and corresponding time of log-in, and optionally time of log-out. The attack-IP map table 237 can include entries associating an IP address with an attack, for example, an attack, an IP address, and a time of attack. The configuration-IP map table 239 can include entries associating an IP address with a configuration, for example, an IP address, a configuration of the IP address, and optionally a time the configuration was detected. The vulnerability-IP map table 241 can include entries associating an IP address with a vulnerability, for example, an IP address, a vulnerability, and optionally a time the vulnerability was detected. One or more of the user name-IP map table 235, the attack-IP map table 237, the configuration-IP map table 239, and the vulnerability-IP map table 241, alternatively can be stored remotely and accessed as needed. Optionally, the user name-IP map table 235, the attack-IP map table 237, the configuration-IP map table 239, and/or the vulnerability-IP map table 241 can be stored in a database rather than a table.

Accordingly, one or more embodiments provide a computer system for determining a user name likely to be associated with an attack, a configuration, or a vulnerability. The computer system can include a display operable to receive screens to be displayed to a user, and a processor cooperatively operable with the memory and the display. The processor can be configured to facilitate obtaining first data which associates user names with individual IP addresses onto which the user names were logged in; obtaining second data which associates attacks, configurations or vulnerabilities with individual IP addresses on which the attacks occurred or on which the configurations or vulnerabilities exist; and associating the user names from the first data with the attacks, configurations or vulnerabilities from the second data based on having the same IP address during a log-in. An individual user name is indicated in a screen to be displayed to a user as being associated with attacks which occurred while the individual user name was logged in and with configurations or vulnerabilities for an IP address onto which the user logs in.

It should be understood that various logical groupings of functions are described herein. Different realizations may omit one or more of these logical groupings. Likewise, in various realizations, functions may be grouped differently, combined, or augmented. Furthermore, functions including those identified as optional can be omitted from various realizations. Similarly, the present description may describe or suggest a database, table or other type of collection of data and information. One or more embodiments can provide that the table, database, and/or collection of data and information can be distributed, combined, or augmented, or provided locally (as illustrated) and/or remotely (not illustrated).

Referring now to FIG. 3, a display illustrating user login history for a host will be discussed and described. In this display 301, there is provided a history of user names 305, user logins 303 and time of log-in 307A, 307B, 307C for a particular IP address. In this representation, the time of log-in is represented as a bar graph. Furthermore, in this example, the display includes the real names (if known) and corresponding user names 305. The user can change the window of time provided in the display 301, in order to view user history over any period of time. Accordingly, one or more embodiments provides that the user name is determined to be no longer associated with the IP address if there is another log-in to the IP address.

Referring now to FIG. 4, an example message of a user login will be discussed and described. FIG. 4 illustrates a data structure representing a log-in event, such as might be received as a user log-in event, and includes a timestamp, an IP address, a user name, an optional protocol, and an optional authorized server IP address. The timestamp, IP address, and user name can be stored as the first data discussed herein. Accordingly, one or more embodiments provide that the user name includes an e-mail address or an IM (instant message) address.

Referring now to FIG. 5, an example message of a user account update will be discussed and described. FIG. 5 illustrates a data structure representing a user account, that is, information which relates to a user name which can be added to an address book. This data structure includes the user name, real name (e.g., first name, initials, last name, full name), and contact information (title, staff identification number, street address, city, state, country or region, postal code, building, location, room, company, division, department, office, mail stop, dmail, phone, IP phone, and email aliases).

Figure 6:
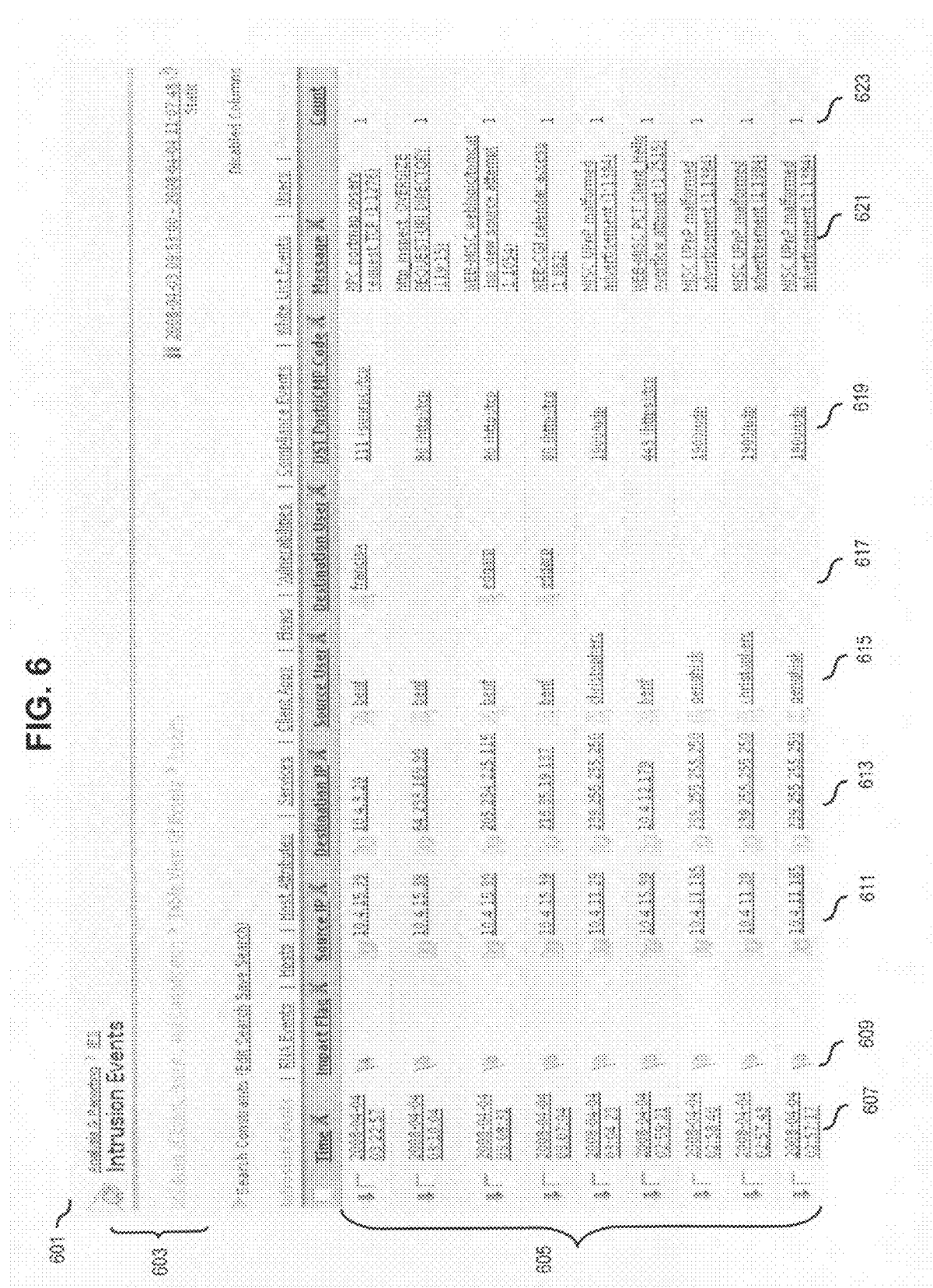
FIG. 6 is an example user interface display.
Figure 7:
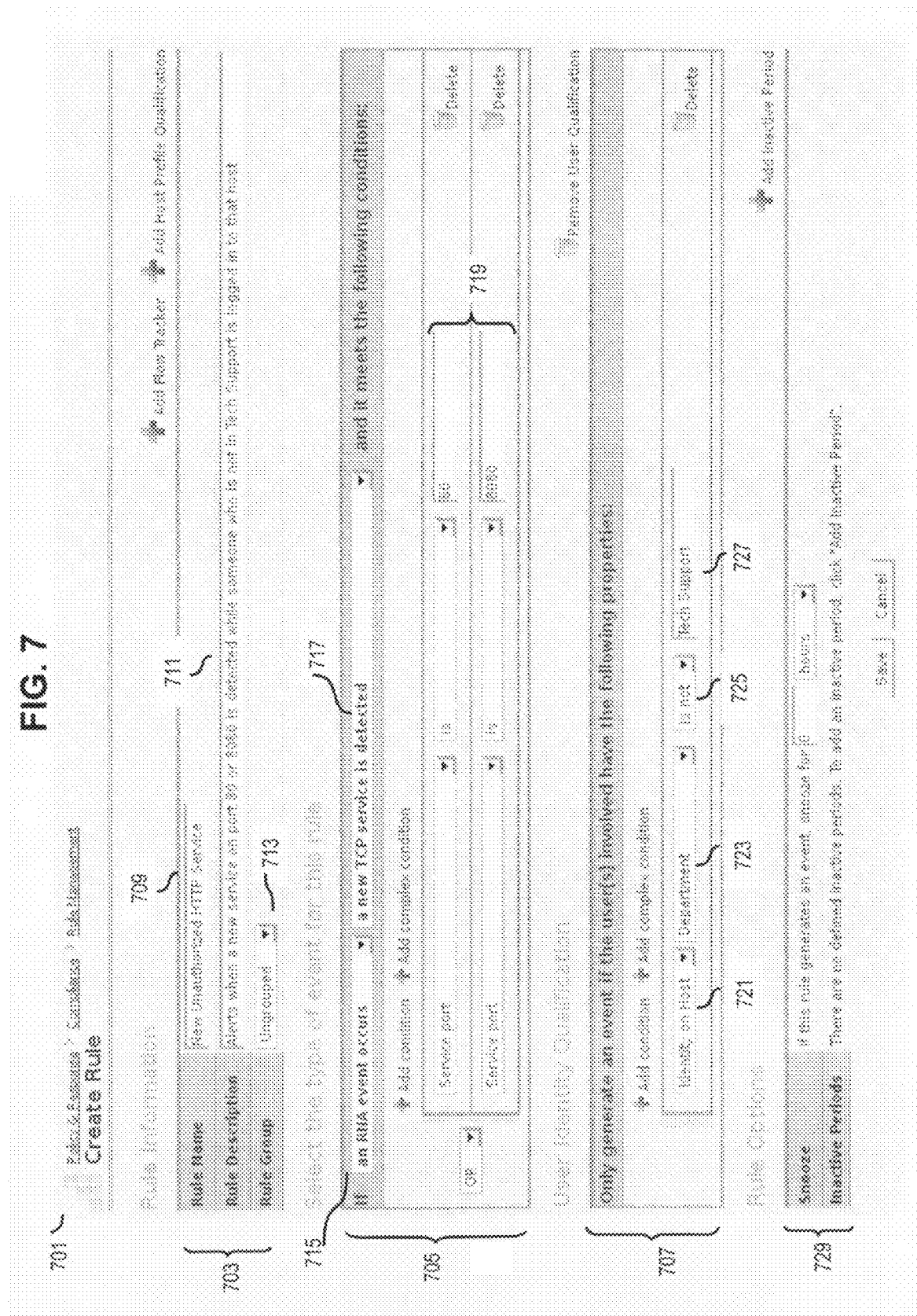
FIG. 7 is another example user interface display.

Various user interface displays can be provided to display view to a user. FIG. 6 and FIG. 7 illustrate example user interfaces, and suggest the range of interfaces. The user interfaces allow an administrator to see what users are on the network and what the users are doing, including individual user names and configurations, vulnerabilities, and/or events which correlate to the user. Example variations on user interface displays are discussed after the detailed discussion of FIG. 7.

Referring now to FIG. 6, an example user interface display will be discussed and described. The user interface 601 provides an example of analysis and reporting of intrusion events, which are a type of attack. Here, the user interface 601 includes a time of the attack 607, an impact flag 609 to indicate the importance of the attack, a source IP address 611 of the attack, a destination IP address 613 of the attack, a source user name 615 of the attack, a destination user name (if any) 617 of the attack, a port and ICMP code 619 during the attack, a message 621 which identifies the attack 623 (here, a type of packet), and a count 623 of occurrences of this event (the attack 623).

A user can interact with the user interface to select, for example, one of the user names 615, 617, which will cause a query to return the real name corresponding to the user name. Also, note that the user interface can be changed to configurations (e.g., hosts, host attributes, services, client applications, flows), other types of attacks (e.g., RNA events, compliance events, white list events), and/or vulnerabilities.

Note that in this case, the user interface 601 provides a level of display 603 which is specific to packets which cause the intrusion events.

Accordingly, one or more embodiment provides for displaying a list of attacks, configurations or vulnerabilities and respective user names individually associated therewith.

Referring now to FIG. 7, another example user interface display will be discussed and described. The user interface 701 provides an example of creating a policy rule using a user name.

The user interface 701 includes rule information 703, a type of event for this rule 705, a user identity qualification 707, and rule options 729. The rule information 703 includes a rule name 709, rule description 711, and rule grouping 713. The type of event for this rule 705 includes the type of event 715 (e.g., RNA (configuration), vulnerability, log-in, attack), the details of the event 717 (e.g., a new TCP service is detected), and the conditions 719. The user identity qualification 707 includes a rule for indicating a user identity event, for example, identity on host 721, department 723, logical condition 725, and user name 727. The rule options 729 include options for snoozing and defining inactive periods.

Other examples of variations on user interface displays will now be discussed and described. A variation of a user interface display is a user table view, which shows all users by user name in the system, the current IP address for that user, and user metadata. If the user's mappings to current IP address have timed out, this can be indicated, for example, by displaying an IP address field that is blank. The user name and metadata can be that which is provided from the first data, that is, the user login events.

Yet another example of user interface displays, user tracking and/or alerting features can be provided. A user-based bandwidth tracking feature can be provided. In the user-based bandwidth tracking feature, an alert and display is provided when any user, regardless of machine, downloads more than a pre-determined number of bytes, e.g., more than 200 megabytes in any given hour. A chatty user feature can be provided. With this feature, a display and/or alert are provided to indicate which users are the top talkers for a specific service or client application.

Accordingly, one or more embodiments provide for writing rules for a compliance policy or remediation system based on the user name.

Further examples of displays can assist an administrator to determine the owner of a new host, where an administrator does not know who a new host belongs to on the network, and needs to find out who is using it.

Another example is to determine whose computer was compromised by an attack. In this example, the administrator sees an intrusion event against a host and wants to alert the user of that host to a possible breach of security.

Yet another example is to determine the users compromised by a specific attack. The administrator sees a flurry of attacks on the network, and wants to get a list of all the users that may be compromised.

Another display is a user table view that displays the users in the system, as well as their last seen IP address (if available). This view contains information such as phone number, email address, department and/or location. The user can navigate to the host, flow, intrusion sensor event, or compliance event table view from the user table view, for example, by using quick link buttons at the top of the table view. The user table view can link to those tables, optionally constraining by the user name.

Another display provides for searching and drilling down on the user name field, including wildcards.

Yet another display provides flow graphs that contain an x-axis field of user name. It can be fully interactive.

A still further table view provides real-time user awareness (RUA) events, with the new user and user login events. This table contains at least the user name, and also contains an IP address if there is a "user login" event. The table can utilize, e.g., link buttons, to allow the user to switch between table views while keeping the User constraint and/or the IP constraint.

Host profile displays can be provided. For example, a user interface can display the last user to be detected on an IP address. The user name can be a link to information (such as metadata) about that user.

Another example is a policy and response display. A user can constrain a rule on a user name by using a User Profile Qualification. For example, if the user wants to alert when a flow is seen which is initiated by user name jsmith to the 10.5 network, the user would create a new rule: a Flow is detected and the responder IP is in 10.5.0.0/16. Then the user would add a user profile qualification: the initiator host's user is jsmith.

Similarly, reporting can be provided, which include the user name as well as other information described above.

Figure 8:
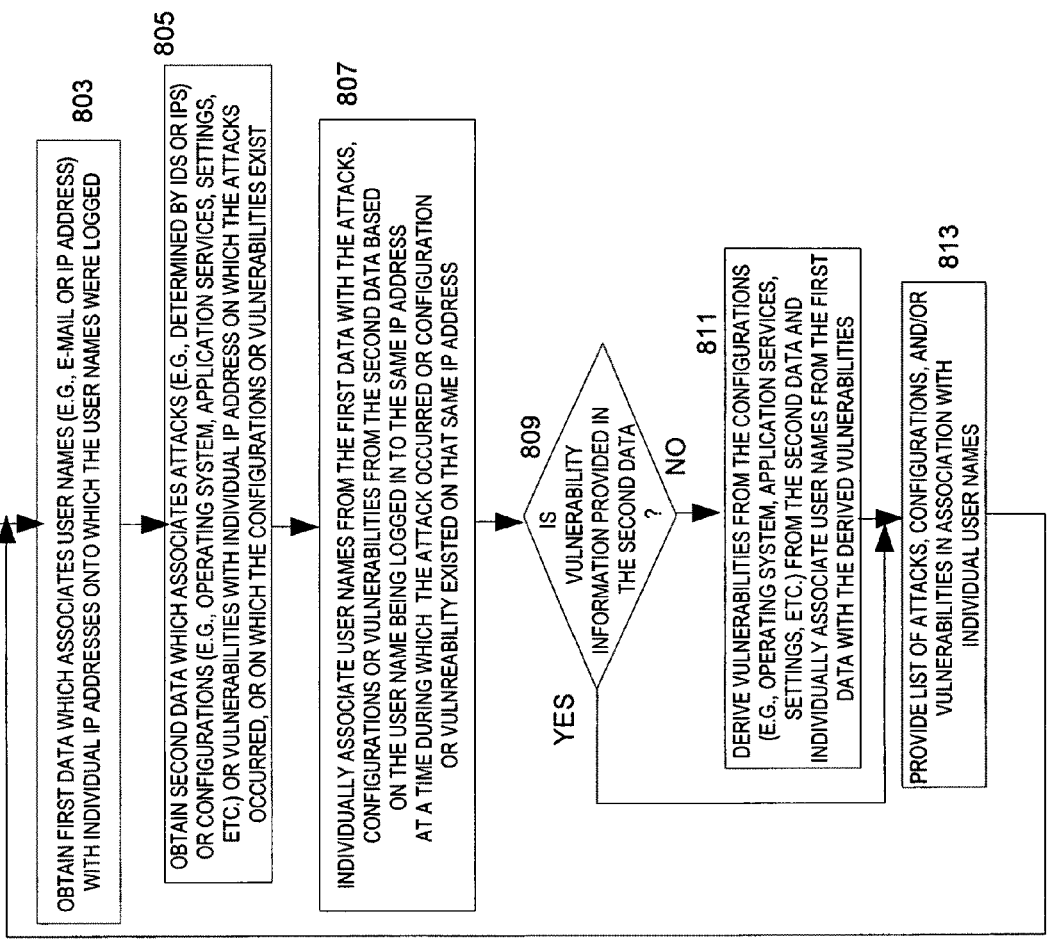
FIG. 8 is a flow chart illustrating a procedure for user awareness.
Figure 9:
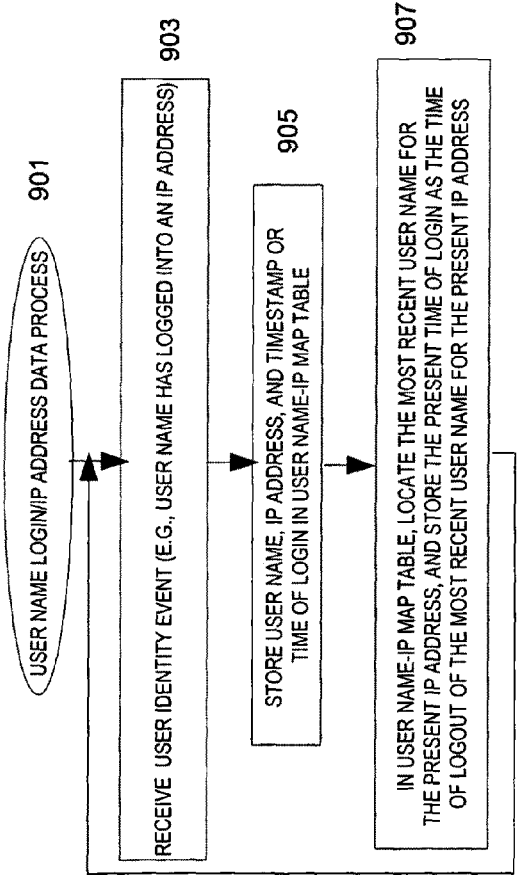
FIG. 9 is a flow chart illustrating a procedure for user name login/IP address data.
Figure 10:
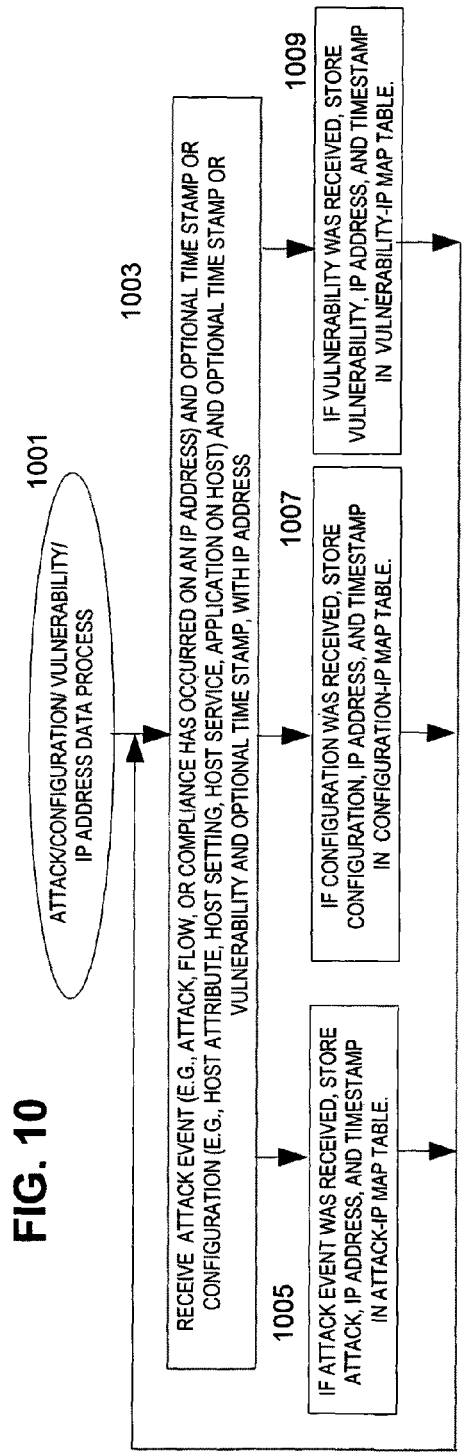
FIG. 10 is a flow chart illustrating a procedure for attack/configuration/vulnerability/IP address data.

FIG. 8 illustrates a procedure for user awareness using the IP address data to map between user name login and attack/configuration/vulnerability. FIG. 9 illustrates a procedure for obtaining user name login/IP address data and FIG. 10 illustrates a procedure for obtaining attack/configuration/vulnerability/IP address data. The procedures can advantageously be implemented on, for example, a processor of a controller, described in connection with FIG. 2 or other apparatus appropriately arranged. Each of these procedures is discussed in more detail below.

Referring now to FIG. 8, a flow chart illustrating a procedure for user awareness will be discussed and described. A procedure 801 to determine user name likely to be associated with an attack, vulnerability or configuration can include the following. Much of the details relating to the following have been discussed in detail above; such detailed discussions will not be repeated.

The procedure 801 can include obtaining 803 first data which associates user names (e.g., e-mail or IP address) with individual IP addresses onto which the user names were logged in. Also, the procedure 801 can include obtaining 805 second data which associates attacks (e.g., determined by an IDS (intrusion detection system) or IPS (intrusion prevention system)) or configurations (for example, operating system, application services, settings, and the like) or vulnerabilities with an individual IP address on which the attacks occurred, or on which the configurations or vulnerabilities exist.

The procedure 801 also includes individually associating 807 user names from the first data with the attacks, configurations or vulnerabilities from the second data based on the user name being logged in to the same IP address at a time during which the attack occurred or configuration or vulnerability existed on that same IP address.

Also, if 809 vulnerability information is not provided in the second data, the procedure 801 optionally can derive 811 vulnerabilities from the configurations (such as operating system, application services, settings, and the like) in the second data, and can individually associate user names from the first data with the derived vulnerabilities. Then, the procedure 801 can provide 813 a list of attacks, configurations, and/or vulnerabilities in association with individual user names.

Accordingly, one or more embodiments provide a method performed by a computer system, for determining a user name likely to be associated with an attack, a configuration. The method includes obtaining first data which associates user names with individual IP addresses onto which the user names were logged in. Also included is obtaining second data which associates attacks, configurations, or vulnerabilities with individual IP addresses on which the attacks occurred or on which the configurations or vulnerabilities exist. Also, the method includes associating the user names from the first data with the attacks, configurations or vulnerabilities from the second data based on having the same IP address during a log-in. An individual user name is indicated as being associated with attacks which occurred while the individual user name was logged in or with configurations or vulnerabilities for an IP address onto which the user logs in.

Referring now to FIG. 9, a flow chart illustrating a procedure for user name login/IP address data will be discussed and described. A procedure for user name login/IP address data 901 includes receiving 903 a user identity event, for example, indicating that a user name has logged in to an IP address. The procedure 901 can store 905 the user name, the IP address, and a timestamp or time of log in, for example, in a user name-IP map table 905. If an event does not include a timestamp, then the time of receipt (or similar) can be used as a timestamp. Then, in the user name-IP map table 907, the procedure 901 can determine the logout. For example, the procedure 901 can locate the most recent user name for the present IP address, and can store the present time of log-in as the time of log-out of the most recent previous user name at the present IP address. That is, when a new user name logs in to an IP address, the previous user name on the same IP address is indicated as being logged out. Optionally, a user identity event can expressly indicate that a user name on an IP address has logged out. The procedure 901 can loop to continuously receive and process user identity events, thereby building a chronological history of user name login/IP address data pairs.

Referring now to FIG. 10, a flow chart illustrating a procedure 1001 for attack/configuration/vulnerability/IP address data will be discussed and described. The procedure 1001 can include receiving 1003 one of several events: an attack event (for example, indicating that an attack, flow, or compliance has occurred on an IP address), a configuration event (such as a host attribute, a host setting, a host service, and/or an application on a host), or a vulnerability event. The events include an IP address on which the event occurred, and optionally include a time stamp. If an event does not include a timestamp, then the time of receipt (or similar) can be used as a timestamp. The procedure 1001 then branches based on the type of the event.

If 1005 the attack event was received, then the attack, IP address, and timestamp are stored, for example, in an attack-IP map table. If 1007 a configuration was received, then the configuration, IP address, and timestamp are stored, for example, in a configuration-IP map table. If 1009 a vulnerability was received, the vulnerability, IP address, and timestamp are stored, for example, in a vulnerability-IP map table. The procedure 1001 can loop to continuously receive and process attack events, configuration events, and vulnerability events, thereby building a chronological history of attack/configuration/vulnerability/IP address pairs.

Moreover, one or more embodiments provide a computer-readable medium comprising instructions being executed by a computer, the instructions including a computer-implemented method for determining a user name likely to be associated with an attack, a configuration, or a vulnerability, the instructions for implementing the foregoing method.

It should be noted that the communication networks of interest include those that transmit information in packets, for example, those known as packet switching networks that transmit data, where data can be divided into packets before transmission, the packets are transmitted, and the packets are routed over network infrastructure devices, which are sent to a destination. Such networks include, by way of example, the Internet, intranets, local area networks (LAN), wireless LANs (WLAN), wide area networks (WAN), and others. Protocols supporting communication networks that utilize packets include one or more of various networking protocols having any link layers that support the TCP transport layer, or any application that rides over the transport layer, and other wireless application protocols or wireline application protocols and/or other protocol structures, and variants and evolutions thereof. Such networks can provide wireless communication capability and/or utilize wireline connections such as cable and/or a connector, or similar.

Furthermore, the designation "intrusion detection system" (IDS) is used herein to denote a device or software that passively or actively analyzes network traffic for intrusions, also referred to herein as "attacks". Examples of such devices or software are sometimes referred to as "intrusion detection system", "intrusion prevention system", "network intrusion detection system", "network intrusion protection system", and the like, and variants or evolutions thereof. An intrusion detection system may be host-based, or may monitor traffic to a target system using, for example, sensors, anywhere between the target system and the intruder, typically after a final router or firewall, or in other software or device which incorporates an intrusion detection/prevention function, such as a firewall, proxy, or the like.

The term "attack" as used herein indicate activity or intrusions, that are typically malicious, for example, denial of service attacks, port scans, attempts to hack into a computer, unauthorized downloads or accesses, and other variations, which have occurred. Software is conventionally available which can identify attacks, for example, SNORT™ from Sourcefire, and other intrusion detection systems, as will be known to one of skill in the art.

Also, the designation "configuration" as used herein indicates the settings and software of a particular computer or device on a network, for example, type and version of operating system, types and versions of services running or installed on the computer or device, types and versions of client applications running or installed on the computer or device, TCP and/or UDP protocols used by the computer or device, other settings and software on the computer or device that can affect the security of a computer or network, and the like, as may be understood and/or varied from time-to-time. Software is conventionally available which can identify configurations of a particular computer system, for example, RNA™ from Sourcefire that can maintain a list of IP addresses and corresponding configurations, such as operating system, services, client applications, TCP and UDP protocols, and the like.

The term "vulnerability" indicates a weakness in a system that can be exploited by an attacker to violate the integrity of that system. Vulnerabilities may result from, for example, software bugs and design flaws, operating system flaws, passwords, backdoors, malware such as a computer virus, a script code injection, or the like. Vulnerabilities of a particular computer system can be determined in various ways, including from a known configuration of that particular computer system, since certain configurations can be determined to be corresponding vulnerabilities. Various commercially available software and/or websites can provide information indicating known vulnerabilities; various commercially available technology can identify specific vulnerabilities in a particular computer system.

The term "IP address" (Internet Protocol address) as used herein is a unique address that devices on a communication network use in order to identify and communicate with each other on a utilizing the Internet Protocol standards (for example, IPv4 or IPv6, further specified in RFC 791, 1519, 1918, 1, 2, 4291), variants, and evolutions thereof, and can include, for example, a dynamic IP address, a static IP address, possibly translated by a network address translator (NAT). The IP address can act as a locator for devices within the network to locate each other, and is unique within the scope of the specific network, such as the global Internet, or a local area network, or an enterprise network.

The term "user name" as used herein refers to a unique sequence of characters which is entered into a computer system to identify a particular user or a particular role (e.g., admin) to the computer system, ordinarily for purposes of accounting, security, logging, and resource management. A user name can be an e-mail address, an IM (instant message) address, a nickname (sometimes known as a "nick" or a "handle"), a user identifier (an integer or unique identifier sometimes used internally within the computer system once a user has logged on), or the like. A user name may or may not resemble the user's real name. Frequently, a user name is used with a password in order to effect a log-in.

This specification also refers to "logging in" or similar. To "log in," as used herein, refers to a known process whereby a user identifies himself or herself by a user name to the computer system in order to obtain access; this establishes what is referred to herein as a "log-in" on the IP address of that computer system for that user name. A user can "log out" when finished accessing the computer system. To log in, a computer system generally requires a user name, frequently with a password which is authenticated. To "log out", as used herein, may be done explicitly by the user performing some action, such as entering a logout command or clicking a logout button; or may be done implicitly, such as by powering the machine off, closing a window, leaving a website, or timing out for lack of activity within a pre-defined period.

The designation "real name" or "real names" is used herein to indicate a name by which a user is known in the real world, typically in the form of a first name or initial and last name or last initial, and can be stored as part of an address book application such as Microsoft Outlook™ Contacts, or other database configured to store address book information such as real name, department, position, user name(s), telephone number(s), and the like. An example address book application which can be queried to return a real name when the user name is input is known as a DAP (directory access protocol) or LDAP (lightweight directory access protocol). Other address book look-up routines and/or applications, variations, and evolutions also may be used to return a real name given the user name.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method performed by a computer system, for determining a user name likely to be associated with an attack, a configuration, or a vulnerability, comprising:
    obtaining first data which associates user names with individual IP addresses onto which the user names were logged in by the computer system;
    obtaining second data which associates attacks, configurations, or vulnerabilities with individual IP addresses on which the attacks occurred or on which the configurations were changed or vulnerabilities existed;
    determining whether the user name from the first data was logged-in to the IP address at a time of the attack, the configuration change, or the vulnerability existence; and
    associating the user names from the first data with the attacks, configurations or vulnerabilities from the second data based on having the same IP address during a log-in,
    wherein an individual user name is indicated as being associated with attacks which occurred or with configurations which were changed or with vulnerabilities which existed, while the individual user name was logged in instead of while logged out for an IP address onto which the user logs in.

2. The method according to claim 1, further comprising displaying a list of attacks, configurations or vulnerabilities and respective user names individually associated therewith.

3. The method according to claim 1, further comprising deriving vulnerabilities for the configurations from the second data, and displaying a list of configurations which have the derived vulnerabilities and respective user names individually associated therewith.

4. The method according to claim 1, further comprising querying for respective real names of the user names, and providing the respective real names and attacks, configurations or vulnerabilities individually associated therewith.

5. The method according to claim 1, wherein the user name is determined to be no longer associated with the IP address if there is another log-in on the IP address.

6. The method according to claim 1, wherein the user name includes an e-mail address or an IM (instant message) address.

7. The method according to claim 1, further comprising writing rules for a compliance policy or remediation system based on the user name.

8. A non-transitory computer-readable medium comprising instructions being executed by a computer, the instructions including a computer-implemented method for determining a user name likely to be associated with an attack, a configuration, or a vulnerability, the instructions for implementing:
    obtaining first data which associates user names with individual IP addresses onto which the user names were logged in;
    obtaining second data which associates attacks, configurations or vulnerabilities with individual IP addresses on which the attacks occurred or on which the configurations were changed or vulnerabilities existed;
    determining whether the user name from the first data was logged-in to the IP address at a time of the attack, the configuration change, or the vulnerability existence; and
    associating the user names from the first data with the attacks, configurations or vulnerabilities from the second data based on having the same IP address during a log-in,
    wherein an individual user name is indicated as being associated with attacks which occurred with configurations which were changed or with vulnerabilities which existed, while the individual user name was logged in instead of while logged out for an IP address onto which the user logs in.

9. The non-transitory computer-readable medium according to claim 8, further comprising instructions for displaying a list of attacks, configurations or vulnerabilities and respective user names individually associated therewith.

10. The non-transitory computer-readable medium according to claim 8, further comprising instructions for deriving vulnerabilities for the configurations from the second data, and displaying a list of configurations which have the derived vulnerabilities and respective user names individually associated therewith.

11. The non-transitory computer-readable medium according to claim 8, further comprising instructions for querying for respective real names of the user names, and providing the respective real names and attacks, configurations or vulnerabilities individually associated therewith.

12. The non-transitory computer-readable medium according to claim 8, wherein the user name is determined to be no longer associated with the IP address if there is another log-in on the IP address.

13. The non-transitory computer-readable medium according to claim 8, wherein the user name includes an e-mail address or an IM (instant message) address.

14. The non-transitory computer-readable medium according to claim 8, further comprising instructions for writing rules for a compliance engine or remediation system based on the user name.

15. A computer system for determining a user name likely to be associated with an attack, a configuration, or a vulnerability, comprising:
   a display operable to receive screens to be displayed to a user; and
   a processor cooperatively operable with the memory and the display, and configured to facilitate:
      obtaining first data which associates user names with individual IP addresses onto which the user names were logged in;
      obtaining second data which associates attacks, configurations or vulnerabilities with individual IP addresses on which the attacks occurred or on which the configurations were changed or vulnerabilities existed;
      determining whether the user name from the first data was logged-in to the IP address at a time of the attack, the configuration change, or the vulnerability existence; and
      associating the user names from the first data with the attacks, configurations or vulnerabilities from the second data based on having the same IP address during a log-in,
   wherein an individual user name is indicated in a screen to be displayed to a user as being associated with attacks which occurred or with configurations which were changed or with vulnerabilities which existed, while the individual user name was logged in instead of while logged out for an IP address onto which the user logs in.

16. The computer system according to claim 15, wherein the processor is further configured to display, on the display, a list of attacks, configurations or vulnerabilities and respective user names individually associated therewith.

17. The computer system according to claim 15, wherein the processor is further configured to derive vulnerabilities for the configurations from the second data, and to display a list of configurations which have the derived vulnerabilities and respective user names individually associated therewith.

18. The computer system according to claim 15, wherein the processor is further configured to query for respective real names of the user names, and providing the respective real names and attacks, configurations or vulnerabilities individually associated therewith.

19. The computer system according to claim 15, wherein the processor is further configured to determine that the user name is no longer associated with the IP address if there is another log-in on the IP address.

20. The computer system according to claim 15, wherein the user name includes an e-mail address or an IM (instant message) address.

* * * * *

UNITED STATES PATENT AND TRADEMARK OFFICE
CERTIFICATE OF CORRECTION

| | |
|---|---|
| PATENT NO. | : 8,127,353 B2 |
| APPLICATION NO. | : 12/149196 |
| DATED | : February 28, 2012 |
| INVENTOR(S) | : Brian Rittermann |

Page 1 of 1

It is certified that error appears in the above-identified patent and that said Letters Patent is hereby corrected as shown below:

Title Page

Item (60) Related U.S. Application Data change "No. 60/924,070" to -- No. 60/924,080 --

Signed and Sealed this
Twenty-eighth Day of May, 2013

Teresa Stanek Rea
*Acting Director of the United States Patent and Trademark Office*